United States Patent [19]
Ostrowski

[11] Patent Number: 5,524,236
[45] Date of Patent: Jun. 4, 1996

[54] APPARATUS FOR DETERMINING THE DIRECTION OF SIGNAL/DATA FLOW ON CSI BUS FOR CONVERTING BETWEEN SINGLE ENDED AND DIFFERENTIAL TYPE SIGNALS

[75] Inventor: Carl L. Ostrowski, Ann Arbor, Mich.

[73] Assignee: Unisys Corporation, Blue Bell, Pa.

[21] Appl. No.: 502,404

[22] Filed: Jul. 14, 1995

Related U.S. Application Data

[63] Continuation of Ser. No. 121,396, Sep. 15, 1993, abandoned.
[51] Int. Cl.⁶ .............................. G06F 5/00; G06F 13/42
[52] U.S. Cl. ............................................ 395/500; 395/285
[58] Field of Search ................................. 395/281, 285, 395/286, 306, 308, 309, 500

[56] References Cited

U.S. PATENT DOCUMENTS

| | | | |
|---|---|---|---|
| 4,864,291 | 9/1989 | Korpi | 395/325 |
| 5,204,951 | 4/1993 | Keener et al. | 395/325 |
| 5,253,348 | 10/1993 | Scalise | 395/325 |

*Primary Examiner*—Richard L. Ellis
*Attorney, Agent, or Firm*—J. Ronald Richebourg; Mark T. Starr; Robert R. Axenfeld

[57] ABSTRACT

The disclosed invention is an apparatus in a computer peripheral device for determining the direction of signal flow and data flow on a SCSI bus, which apparatus comprises a time delay means responsive to status signals of the SCSI bus. The time delay means generates a signal that defines an arbitration selection period of time for determining control of the SCSI bus. The apparatus further includes a first circuit means responsive to the arbitration selection signal and status signals of the SCSI bus. The first circuit means generates a plurality of signals that determine whether the peripheral device is an initiator of signals to be transmitted on the bus or is a target for receipt of signals present on the bus. Moreover, the apparatus includes a second circuit means that is responsive to the plurality of signals generated by the first circuit means and status signals of the bus. The second circuit means generates a pair of signals indicative of the direction of data and signal flow on the SCSI bus.

17 Claims, 8 Drawing Sheets

APPARATUS FOR DETERMINING THE DIRECTION OF SIGNAL/DATA FLOW ON CSI BUS FOR CONVERTING BETWEEN SINGLE ENDED AND DIFFERENTIAL TYPE SIGNALS

This is a continuation of U.S. application Ser. No. 08/121,396 filed on Sep. 15, 1993 now abandoned.

FIELD OF THE INVENTION

The disclosed invention relates to the field of peripheral devices and more particularly to circuitry within a peripheral device for determining the direction of signal flow on a SCSI (Small Computer Systems Interface) bus using protocol standards.

BACKGROUND OF THE INVENTION

In the art of computer technology, it is typical to employ peripheral devices that are controlled by a separate bus controller. An example of this prior art technique is disclosed in U.S. Pat. No. 4,864,532 entitled SMALL COMPUTER SYSTEMS INTERFACE-DATA LINK PROCESSOR, assigned to the assignee hereof. In this prior art system a separate SCSI protocol controller was disclosed for use between a SCSI bus coupled to a plurality of disk drives and a data bus coupled to a host computer.

To meet the requirements for SCSI, high performance and simplicity of the peripheral devices are paramount. The widespread and growing acceptance of SCSI is largely a function of the combination of simplicity and the functionality it offers. SCSI is a bus architecture, and as such dictates a set of standard signal protocols. A bus can support up to eight separate addresses. The architecture allows for multiple host connections and peripheral devices to coexist on the same bus. With one host connected to the bus, the remaining seven addresses can be used to attach up to seven peripheral devices.

Most peripheral interfaces support a master/slave relationship, with the host as the master and the peripheral as the slave. This arrangement is satisfactory in the high end of the market where the complex disk subsystems include multiple controllers, multiple ports and multiple paths. However, these sophisticated devices are cost-prohibitive in the entry/medium computer system marketplace. SCSI can provide substantial functionality in this area because of its peer-to-peer design. Any device attached to a SCSI bus may either assume the role of the requestor of services or the supplier of services. A device may change its role whenever required. During any particular transaction the device requesting the service is called the initiator, while the device requested to provide the service is called the target. When two or more hosts are attached to a common bus, each has visibility to any attached peripheral.

All SCSI commands are high-level logical commands. This removes the requirement for initiators to "understand" the detailed operation of the targets. All bus data transfers are independent of the timing constraints of the peripheral devices. Data is transferred from the device buffers at bus speed rather than device speed.

Where the SCSI bus is adapted to transfer signals in a differential format (which is a majority of applications) and a single-ended device is coupled to the bus, then circuitry must be provided to convert back and forth between formats at a high rate of speed. Moreover, additional circuitry is required to determine the direction of signal flow and to control the conversion circuitry as well, all at a high rate of speed.

BRIEF SUMMARY OF THE INVENTION

The apparatus of the present invention is adapted to control the direction of signal flow through differential transceivers and single-ended drivers/receivers. During the relatively slow beginning (arbitration/selection phases) individual signals are allowed to pass through (differential to single-ended or single-ended to differential), but after these phases circuitry of the apparatus determines which device is the TARGET and which is the INITIATOR. The apparatus then uses the SCSI defined signals of MSG, C/D and I/O to preset the direction of data flow. Accordingly, this circuitry arrangement provides an advantage of allowing fast data transfers (that is, not having to determine the direction of data flow for every change of signal).

The disclosed invention is an apparatus in a computer peripheral device for determining the direction of signal flow and data flow on a SCSI bus, which apparatus comprises a time delay means responsive to status signals of the SCSI bus. The time delay means generates a signal that defines an arbitration selection period of time for determining control of the SCSI bus. The apparatus further includes a first circuit means responsive to the arbitration selection signal and status signals of the SCSI bus. The first circuit means generates a plurality of signals that determine whether the peripheral device is an initiator of signals to be transmitted on the bus or is a target for receipt of signals present on the bus. Moreover, the apparatus includes a second circuit means that is responsive to the plurality of signals generated by the first circuit means and status signals of the bus. The second circuit means generates a pair of signals indicative of the direction of data and signal flow on the SCSI bus.

DETAILED DESCRIPTION

Figure 1:
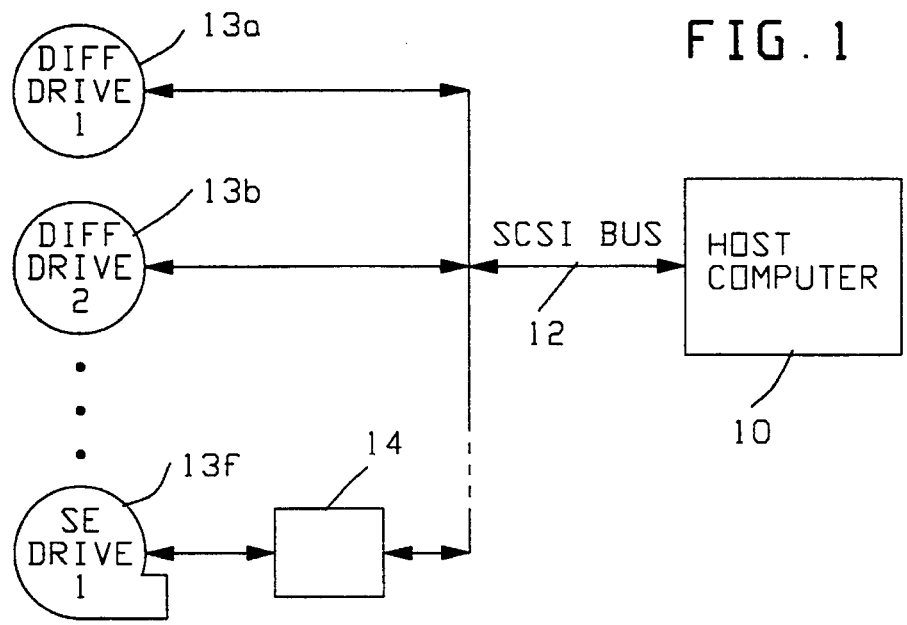
FIG. 1 is an overall block diagram of a computer system having coupled thereto a plurality of peripheral devices.

Referring now to the drawings and FIG. 1 in particular, a host computer 10 is coupled to a SCSI bus 12, which in the disclosed embodiment is adapted to transmit and receive signals in a differential format. Also, a plurality of peripheral devices 13a–13f are coupled to the same SCSI bus 12. However, the exemplary device 13f is a single-ended device such as a tape drive. A circuit 14 is disposed between the device 13f and the computer 10 to convert between the signal formats of single-ended and differential and to determine the direction of flow by use of SCSI protocol.

For background purposes, the signals transmitted on the SCSI bus 12 are as follows:

ACK(ACKNOWLEDGE): Driven by the Initiator to acknowledge an Information transfer.

ATN (ATTENTION): Driven by the Initiator when connected to get the Target's attention for sending a MESSAGE OUT, BSY (BUS BUSY): Indicates that the SCSI Bus is in use. Also, used to gain control of the Bus.

C/D (COMMAND OR DATA): Driven by the Target to indicate the Bus Phase. In general, it indicates whether data or "other information" is being transferred.

DB(7–0) (DATA BUS): Driven by either device, as determined by the state of the I/O signal. Contains the data that is sent from one device to the other during an Information Transfer.

DB (P) (DATA BUS PARITY): Driven by either device. Contains the parity bit for the data that is sent on DB(0–7) from one device to the other during Information Transfer.

I/O (INPUT OR OUTPUT): Driven by the Target to indicate the Bus Phase. In general, I/O indicates the bus information transfer direction. I/O also determines the SELECTION and RESELECTION phases. "True/Asserted" indicates the direction from the Target to the Initiator.

MSG (MESSAGE PHASE): Driven by the Target to indicate the Bus Phase. In general, indicates whether the "other" information alluded to under C/D is a MESSAGE IN, MESSAGE OUT, COMMAND, or STATUS information.

REQ (REQUEST): Driven by the Target to request an Information Transfer.

RST (BUS RESET): Driven by any device to clear all devices from the bus. May cause "power on reset" type condition on many devices.

SEL (SELECT DEVICE): Driven by: (1) an Initiator to select a Target; or, (2) a Target to reselect an Initiator.

Figure 2:
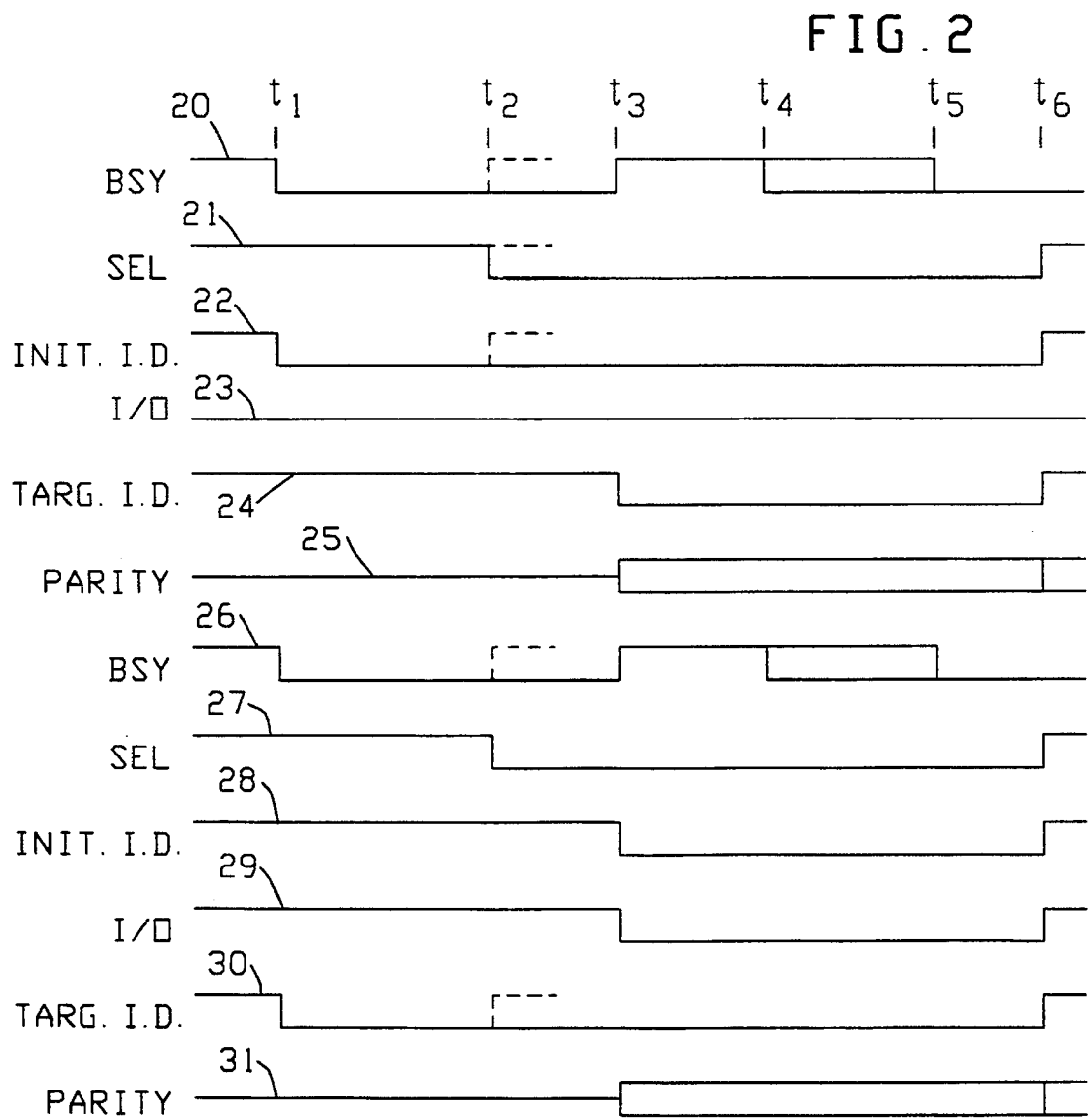
FIG. 2 is a timing diagram showing operation of the SCSI bus and control thereof.

Referring now to FIG. 2, a timing diagram illustrating the arbitration/selection process is shown. Waveform 20 represents the BSY signal (active low) and waveform 21 represents the SEL signal (also active low). In the scenario depicted by this timing diagram, the Bus is Free just prior to time $t_1$, which is the initial state of the SCSI Bus Protocol. At this time, one of the devices on the SCSI bus can start communicating with another device on the bus. Once the Bus Free state is detected, one of the devices drives the BSY signal with its ID bit on one of the data bus signals. This is the arbitration period or phase wherein two or more devices are also driving the BSY signal so as to gain control thereof. The time between $t_1$ and $t_6$ is the arbitration/selection period.

All devices read the data bus to determine which device has the highest priority identification ("ID"). The device that succeeds in gaining control of the bus becomes the INITIATOR device, or in the event of a RESELECTION the TARGET device. Assume this is a SELECTION and not a RESELECTION. Thus, the device selected becomes the TARGET device.

Waveform 22 depicts the initiator identification INIT I.D. (active low), which occurs in this scenario from time $t_1$ to time $t_6$. Waveforms 23 depicts the I/O signal, and waveform 24 depicts the target identification TARG. I.D., which goes active (low) at time $t_3$. Finally, waveform 25 represents that the parity bit of data is valid., Referring again to waveform 20,, the INITIATOR drives the bus busy, arbitrates for control of the bus, and all loser devices release the bus at time $t_1$. Note that the TARGET responds busy at time $t_4$. At time $t_5$ the INITIATOR releases the bus busy. After time $t_6$ the bus returns to normal phases, i.e., the ARBITRATION/SELECTION process is complete, and the time after $t_6$ is where the SCSI signals MSG, CD and I/O determine the phase and direction of the SCSI signal flow.

Waveform 26 represents the BSY signal for a RESELECTION scenario. From time $t_3$ to time $t_6$ I/O is shown low or asserted, which means that the apparatus is in the SELECT mode of operation. It should be pointed out at this juncture that only a TARGET device can perform a RESELECTION. Note that from time $t_1$ to time $t_3$ the bus is driven by the TARGET. From time $t_3$ to time $t_4$ the bus is busy (BSY) and the TARGET is waiting for the INITIATOR to drive BSY. At time $t_4$ the INITIATOR drives BSY. From time $t_4$ to time $t_5$ the TARGET detects that the INITIATOR is driving BSY. Hence, both the TARGET and the INITIATOR are driving busy at the same time. At time $t_6$ SEL goes away and the INITIATOR stops driving BSY, but the TARGET continues driving BSY.

Figure 3:
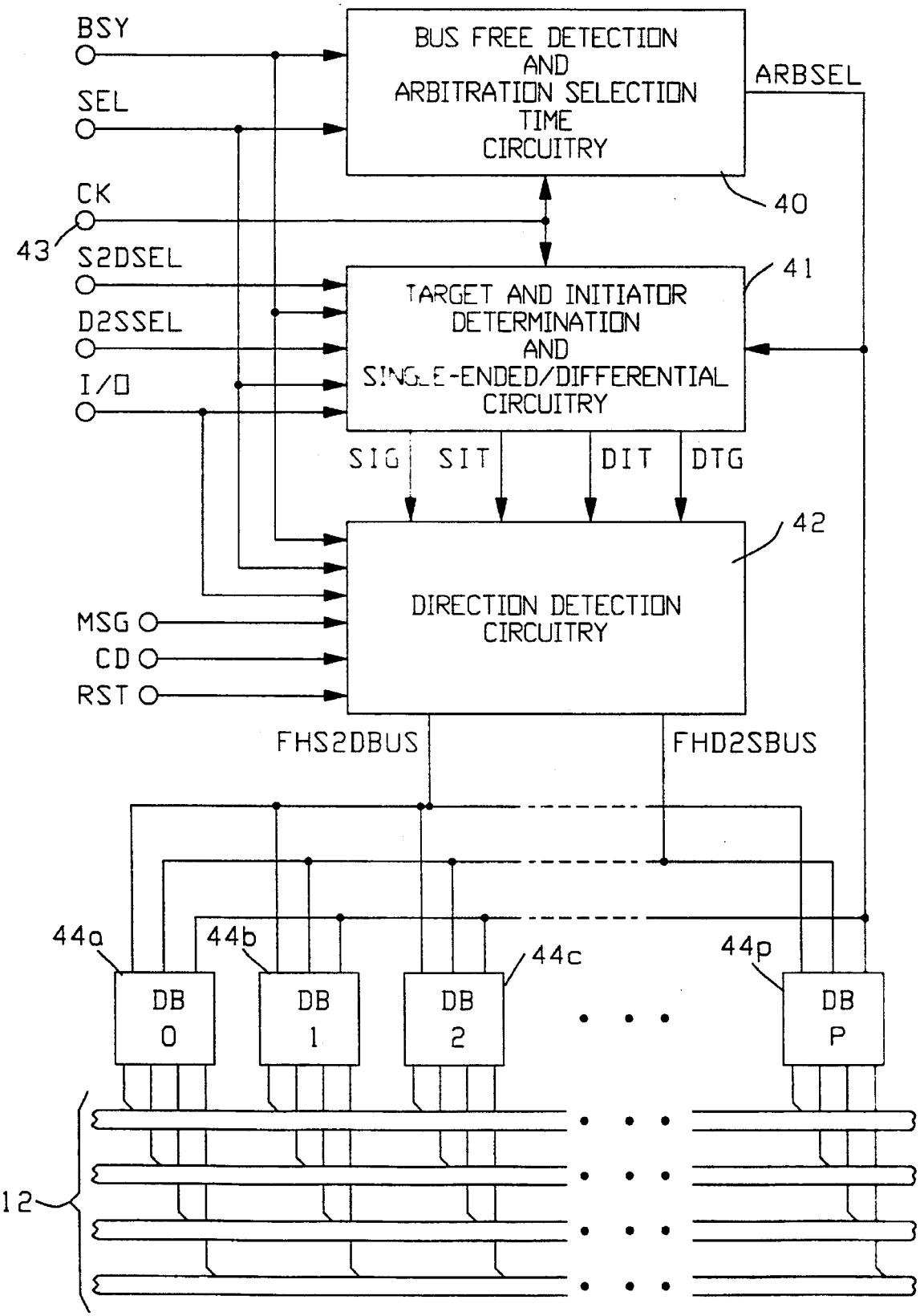
FIG. 3 is a block diagram of the circuit of the present invention.

Referring now to FIG. 3, a block diagram of the present invention is shown. The BSY and SEL signals from the SCSI bus 12 are applied to input terminals of a BUS FREE DETECTION and ARBITRATION SELECTION TIME CIRCUITRY 40, a TARGET and INITIATOR DETERMINATION and SINGLE-ENDED/DIFFERENTIAL CIRCUIT 41 and a DIRECTION DETECTION CIRCUIT 42. A clock (CK) signal is supplied to circuits 40 and 41 from a terminal 43. The I/O signal from the bus 12 is supplied to input terminals of the circuits 41 and 42. The MSG, CD and RST signals form the bus 12 are also applied to input terminals of the circuit 42.

As will be shown in greater detail hereinafter, the circuit 40 generates an ARBSEL (arbitration select) signal as a function of the BSY, SEL and CK signals. The ARBSEL signal is used to gate activity of the circuit 41. The ARBSEL signal is also coupled to conversion circuits 44a–44r. At this juncture it should be pointed out that in the disclosed embodiment there are eighteen individual conversion circuits. Details of the conversion circuits 44a–44r are shown in greater detail in FIG. 7, and will be amplified in greater detail hereinbelow.

The output results of the circuit 41, which are STG (single-ended, Target), SIT (single-ended, Initiator), DTG (differential, Target) or DIT (differential, Initiator). Moreover, the bus signals MSG, CD, I/O and RST are applied to input terminals of the circuit 42. The output results of the circuit 42 determine the direction of data and control signal flow on the bus 12 following the SCSI protocol. The direction signals are identified as FHS2DBUS and FHD2SBUS, which mean force high single-ended to differential or force high differential to single-ended. These signals are coupled to a pair of input terminals of the conversion circuits 44a–44p, respectively. The outputs of the circuits 44a–44p are coupled to the SCSI bus 12.

Figure 4:
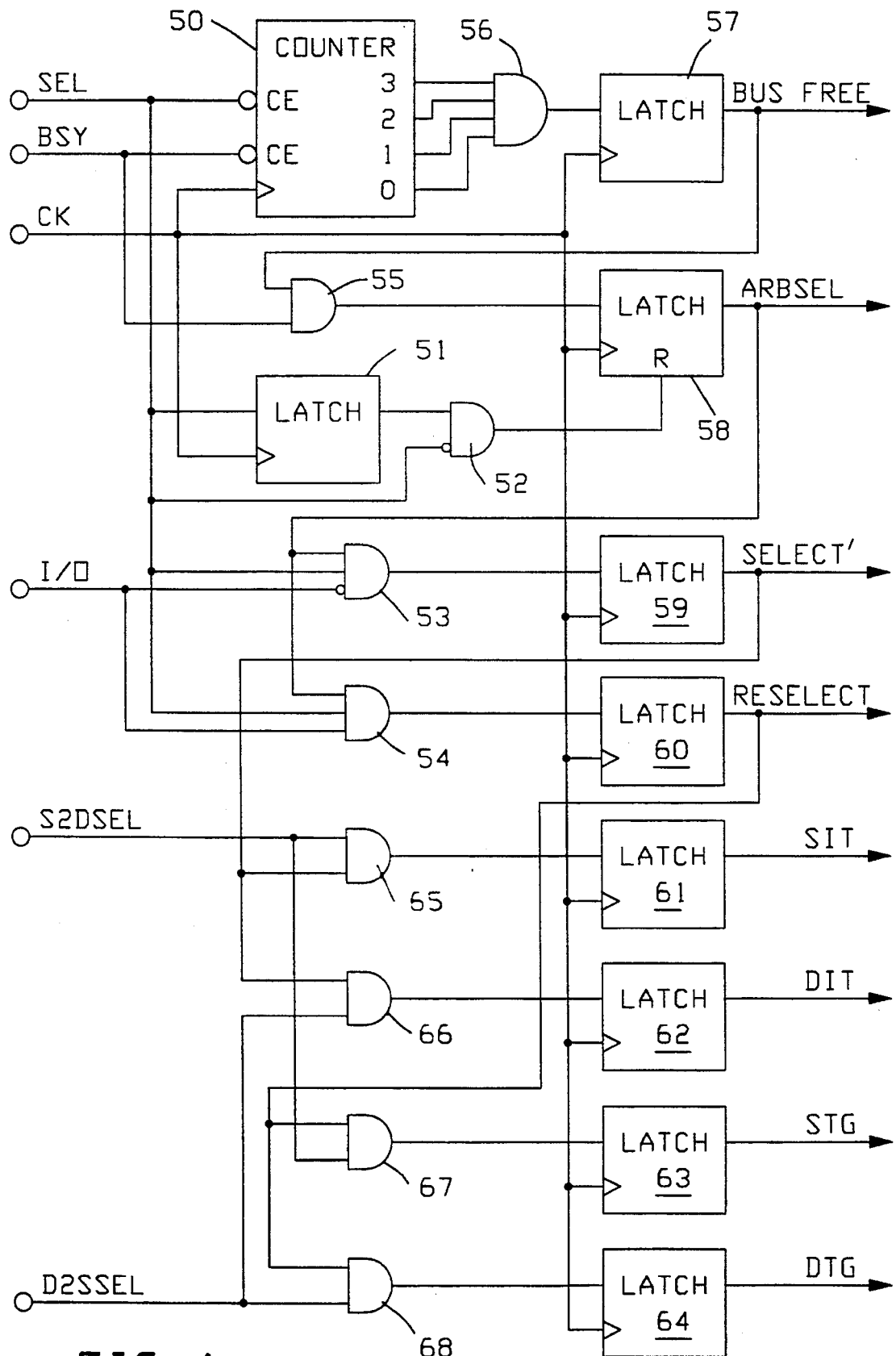
FIG. 4 is a logic diagram of the Arbitration and the Target/Initiator Determination circuits of the present invention.

Details of the circuits 40 and 41 are illustrated in the logic diagram of FIG. 4. The SEL signal is coupled to an inverting chip enable (CE) input terminal of a counter 50, to the D input terminal of a latch 51, to an inverting input terminal of an AND gate 52, to one of three input terminals of an AND gate 53 and to one of three input terminals of an AND gate 54. The BSY signal is applied to a second inverting CE input terminal of the counter 50, and to one of two input terminals of an AND gate 55.

The 0–3 output terminals of the counter 50 are coupled to four input terminals of an AND gate 56, respectively. The output of the AND gate 56 is coupled to the D input terminal of a latch 57. The output of the latch 57 is coupled to the second input terminal of the AND gate 55 and represents the BUS FREE signal.

The CK, or clock, signal is coupled to the clock terminal of the counter 50, the latches 51 and 57, and to clock terminals of additional latches 58–64. The output terminal of the latch 58 is coupled to the D input terminal of the latch 58, and the output terminal of the AND gate 52 is coupled to the reset (R) input terminal of this same latch 58. The output of the latch 58 is coupled to second input terminals of the AND gates 53 and 54, and represents the ARBSEL signal.

As a function of the clock frequency and the aforedescribed structure, it takes approximately 800 nanoseconds for all four inputs to the AND gate 56 to be satisfied. Hence, if the BSY signal goes away for 800 nanoseconds then the bus is free. The output of the latch 57 represents the BUS FREE status, and this signal is combined with the BSY signal at the AND gate 55 to set the latch 58. The output of the latch 58 represents that the arbitration select (ARBSEL) phase may begin.

The I/O signal of the SCSI bus is applied to an inverting input terminal of the AND gate 53, and to a third input terminal of the AND gate 54. The output of the AND gate 53 is coupled to the D input terminal of the latch 59, and the output of the AND gate 54 is coupled to the D input terminal of the latch 60. The output of the latch 59 is coupled to one of two input terminals of AND gates 65 and 66, and is identified as the SELECT' signal which denotes that the circuit is in the select mode of operation. The output of the latch 60 is coupled to one of two inputs of an AND gates 67 and 68, and is identified as the RESELECT signal which denotes that the circuit is in the reselect mode of operation.

When a single-ended unit is driving the SEL signal, a signal denoted herein as S2DSEL is active high and is applied to the second input terminals of the AND gates 65 and 67. In a similar manner when a differential unit is driving the SEL signal, a signal denoted herein as D2SSEL is active high and is applied to the second input terminals of the AND gates 66 and 68.

The output of the latch 61 is the SIT signal, which means that the INITIATOR device is single-ended. The output of the latch 62 is the DIT signal, which means that the INITIATOR device is differential. The output of the latch 63 is the STG signal, which means that the TARGET device is single-ended. And, the output of the latch 64 is the DTG signal, which means that the TARGET is a differential device.

Figure 5:
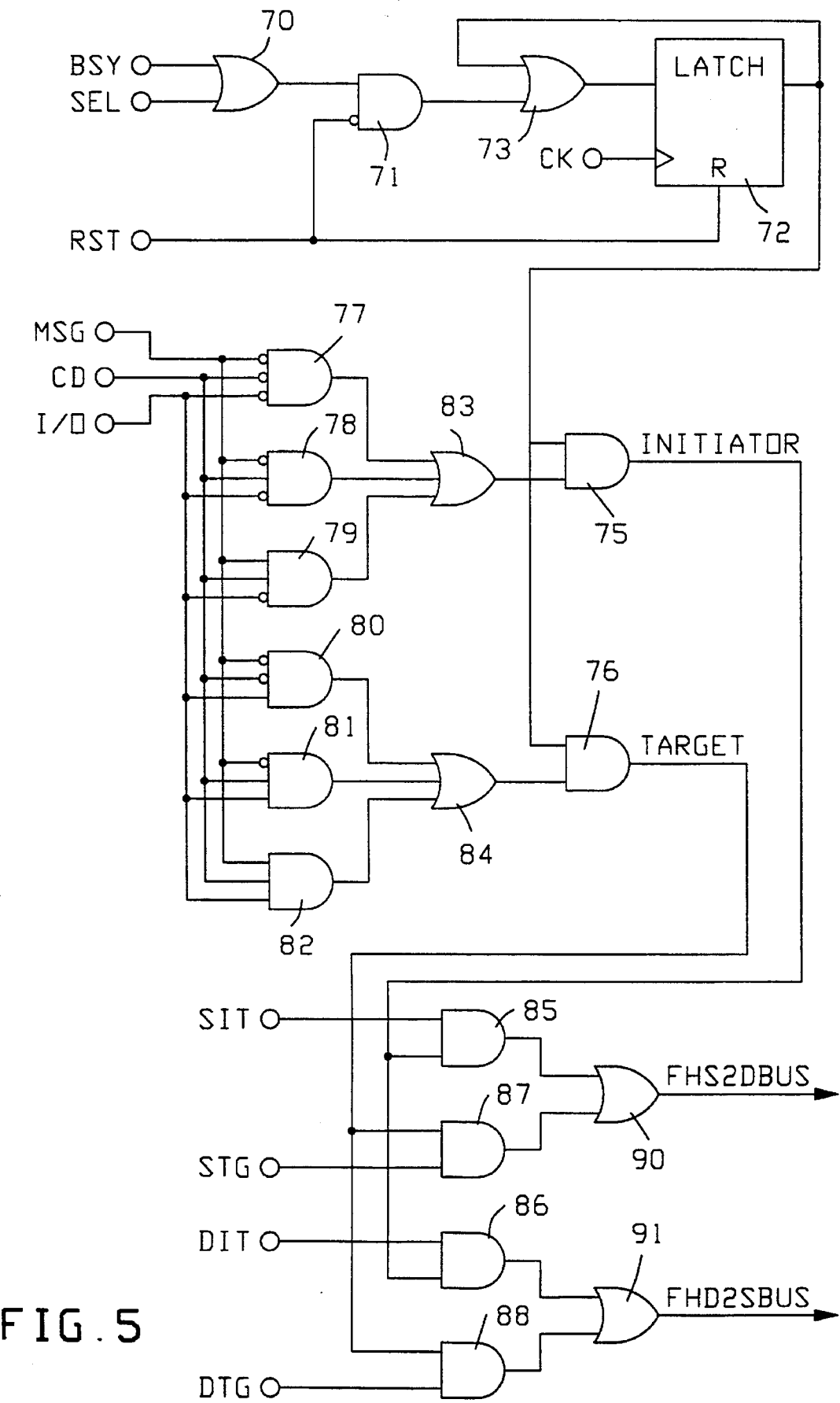
FIG. 5 is a logic diagram of the SCSI Bus Direction Detection Circuitry.

Referring now to FIG. 5, a logic diagram of the SCSI Bus Direction Detection Circuitry is shown. The BSY and SEL signals from the bus 12 are coupled, respectively, to two input terminals of an OR gate 70, and the output thereof is coupled to one of two input terminals of an AND gate 71. The RST signal is coupled to an inverting input terminal of the AND gate 71, and to the reset (R) input terminal of a latch 72. The output of the AND gate 71 is coupled to one of two input terminals of an OR gate 73, and the output thereof is coupled to the D input terminal of the latch 72. The CK signal is coupled to the clock input of the latch 72, and the output of this latch is coupled back to a second input of the OR gate 73, and to one of two input terminals of AND gates 75 and 76, respectively.

The MSG signal on the SCSI bus is coupled to inverting input terminals of AND gates 77 and 78, to an input of an AND gate 79, to inverting input terminals of AND gates 80 and 81 and to an input of an AND gate 82. The CD signal on the SCSI bus is coupled to an inverting input of the AND gate 77, inputs of the AND gate 78 and 79, an inverting input of the AND gate 80 and to inputs of the AND gates 81 and 82. The I/O signal on the bus 12 is coupled to inverting input terminals of AND gates 77, 78 and 79, and to inputs of the AND gates 80, 81 and 82.

The output terminals of the AND gates 77, 78 and 79 are coupled to inputs of an OR gate 83 and the output thereof is coupled to the second input terminal of the AND gate 76. The output of the AND gate 75 is the result of the determination that the direction of signal flow is out of the INITIATOR, and is coupled to one of two input terminals of AND gates 85 and 86. In a similar manner, the outputs of the AND gates 80, 81 and 82 are coupled to input terminals of an OR gate 84, and the output thereof is coupled to the second input of the AND gate 76. The output of the AND gate 76 is the result of the determination that the direction of signal flow is out of the TARGET, and is coupled to one of two inputs of AND gates 87 and 88.

The output of the latch 61 (FIG. 4), which is the SIT signal (single-ended, Initiator), is coupled to the second input terminal of the AND gate 85. The output of the latch 63 (FIG. 4), which is the STG signal (single-ended, Target), is coupled to the second input terminal of the AND gate 87. The output terminals of the AND gates 85 and 87 are coupled to two input terminals of an OR gate 90, and the output thereof is the FHS2DBUS signal, which means Force High Single-ended to Differential Bus, or that the direction of data flow is from single-ended to differential.

The output of the latch 62 (FIG. 4), which is the DIT signal (Differential, Initiator), is coupled to the second input terminal of the AND gate 86. The output of the latch 64 (FIG. 4), which is the DTG (Differential, Target), is coupled to the second input of the AND gate 88. The outputs of the AND gates 86 and 88 are coupled to two input terminals of an OR gate 91, and the output thereof is the FHD2SBUS signal, which means Force High Differential to Single-ended Bus, or that the direction of data flow is from differential to single-ended.

Figure 6:
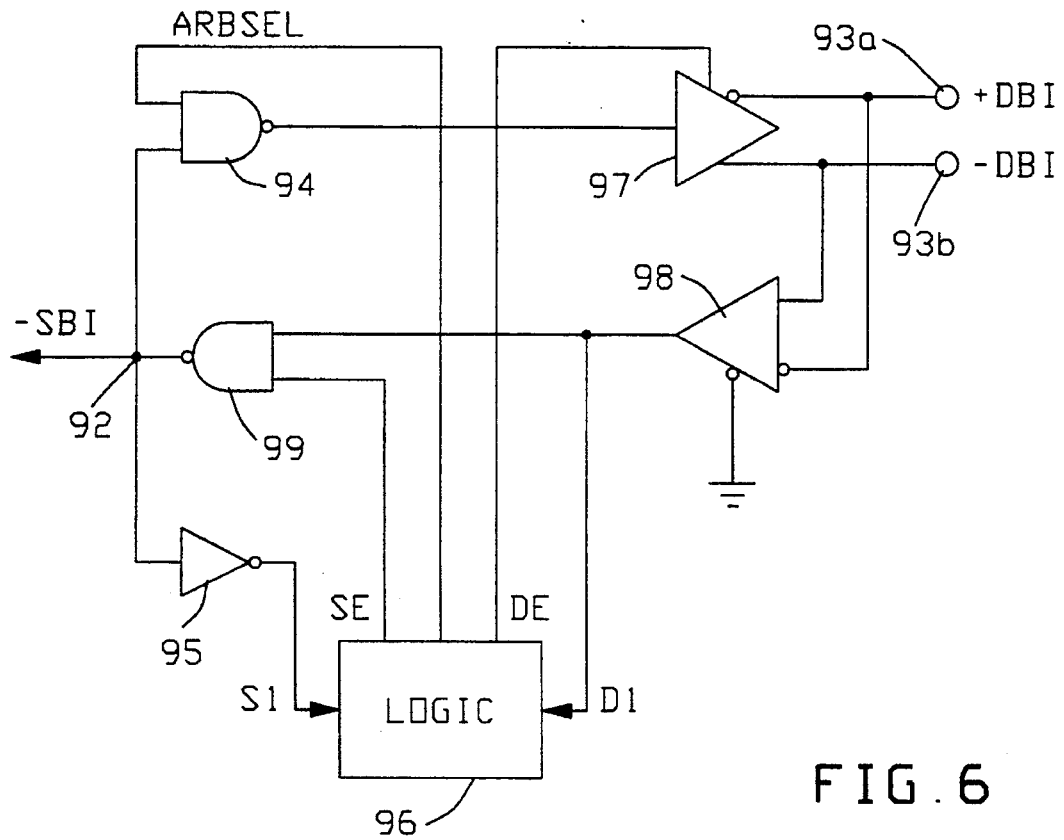
FIG. 6 is a block-schematic diagram illustrating connections between a single-ended device and a differential SCSI bus.

Referring now to FIG. 6, a block-logic diagram of connections to a SCSI bus are shown in detail. A single-ended signal (denoted herein as "SB1") is applied on a node 92, and a differential signal (denoted herein as "+DB1" and "–DB1") is applied on nodes 93a and 93b.

If a single-ended signal is applied to the node 92, then this signal is supplied to one of two inputs of a NAND gate 94 and to the input of an inverter 95. The output of the inverter 95, which is denoted as S1, is coupled to an input of logic 96. As will be shown in greater detail hereinafter, an ARBSEL (ARBITRATION SELECT) signal from the logic 96 enables the NAND gate 94 to pass the SB1 signal through to an amplifier 97 having outputs coupled to the nodes 93a and 93b. Another output signal "DE" (DIFFERENTIAL ENABLE) is coupled from the logic 96 to an enabling input of the amplifier 97. Thus, the single-ended signal SB1 is converted to a differential signal and supplied on the nodes 93a and 93b, which are coupled to the SCSI bus.

A differential signal, +DB1/–DB2, applied to the nodes 93a and 93b from the SCSI bus are coupled to input terminals of an amplifier 98. The enable input of the amplifier 98 is coupled to ground potential, which makes the amplifier always enabled. Hence, the differential signal appears at the output of the amplifier 98 and is labeled herein as "D1". The D1 signal is applied to another input terminal of the logic 96, and as will be shown hereafter, generates a single-ended enable signal "SE". The SE signal is coupled to one of two inputs of a NAND gate 99. The second input of the NAND gate 99 is coupled to the output of the amplifier 98. Thus, when the SE signal enables the NAND gate 99, the D1 signal is passed through to the node 92 thereby being converted to a single-ended signal.

Figure 7:
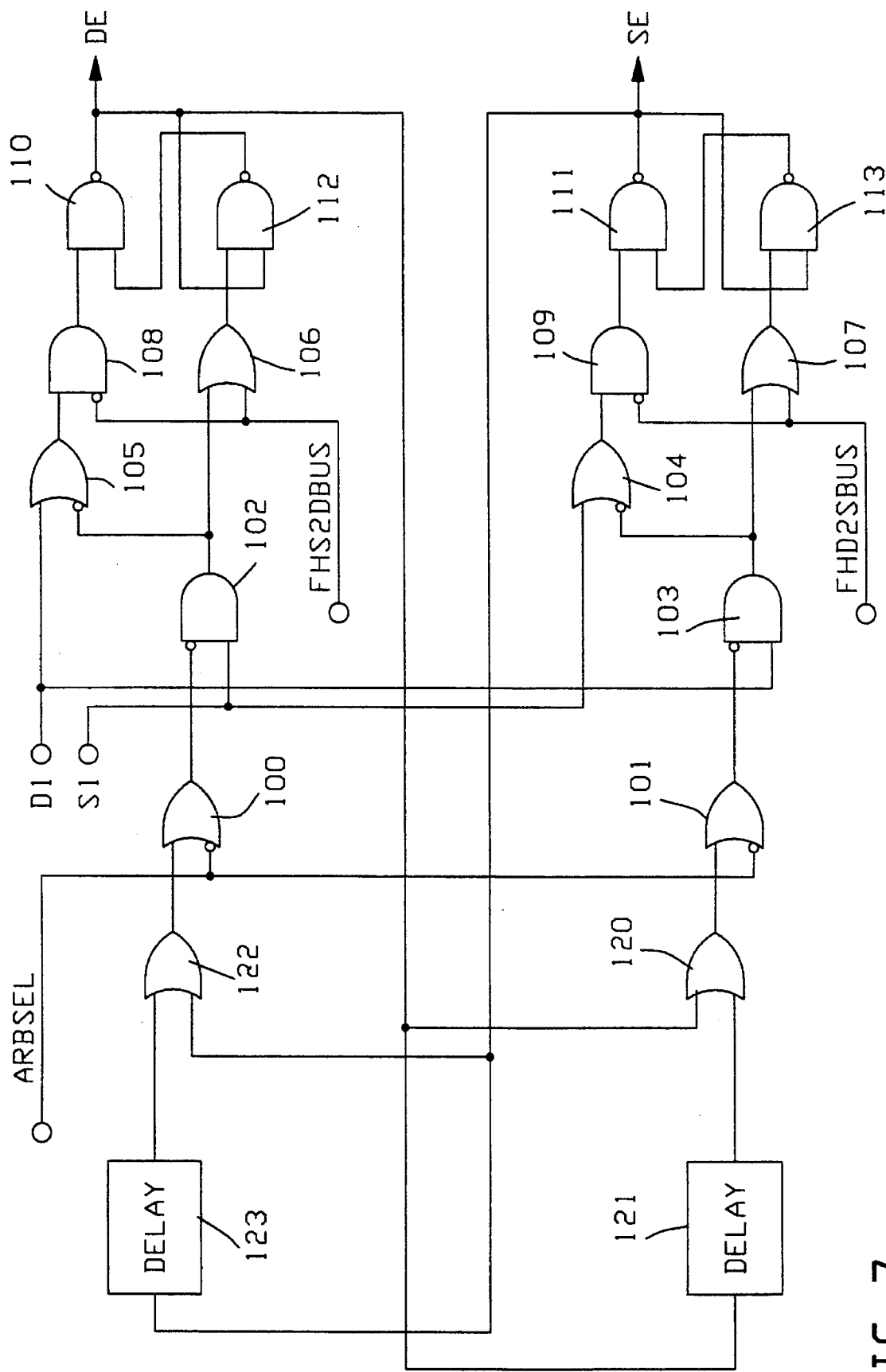
FIG. 7 is a logic diagram of a differential to single-ended converter.

Referring now to FIG. 7, details of the converter circuits 44a–44p are illustrated. The ARBSEL signal is applied to inverting input terminals of OR gates 100 and 101. The output of the OR gate 100 is coupled to an inverting input of an AND gate 102, and in a similar manner, the output of the OR gate 101 is coupled to an inverting input of an AND gate 103. The singled-ended signal (S1) from the output of the inverter 95 (FIG. 6) is coupled to the second input of the AND gate 102 and to one of two inputs of an OR gate 104.

The differential signal (D1) from the output of the amplifier 98 (FIG. 6) is coupled to the second input of the AND gate 103 and to one of two inputs of an OR gate 105. The output of the AND gate 102 is coupled to an inverting input of the OR gate 105 and to one of two input terminals of an OR gate 106. Similarly, the output of the AND gate 103 is coupled to an inverting input of the OR gate 104 and to one of two inputs of an OR gate 107. The output of the AND gate 105 is coupled to one of two inputs of an AND gate 108, and the output of the OR gate 104 is coupled to one of two inputs of an AND gate 109.

Override signals, identified herein as "FHS2DBUS" and "FHD2SBUS" are coupled to input terminals of gates 106 and 108 and 107-and 109, respectively. The output of the AND gate 108 is coupled to one of two inputs of a NAND gate 110. In a similar manner, the output of the AND gate 109 is coupled to one of two inputs of a NAND gate 111. The output of the OR gate 106 is coupled to one of two inputs of a NAND gate 112, and similarly the output of the OR gate 107 is coupled to one of two inputs of a NAND gate 113.

The output of the NAND gate 112 is coupled to the second input of the NAND gate 110 and in a similar fashion the output of the NAND gate 113 is coupled to the second input of the NAND gate 111. The output of the NAND gate supplies the DE signal, and is coupled to the second input of the NAND gate 112, to one of two inputs of an OR gate 120 and to the input of a delay circuit 121. Similarly, the output of the NAND gate 111 supplies the SE signal and is coupled to the second input of the NAND gate 113, to one of two inputs of an OR gate 112 and to a delay circuit 123. It is the function of the delay circuits 121 and 123 to prevent a race condition that could occur when making a transition from one signal format to the other.

Figure 8A:
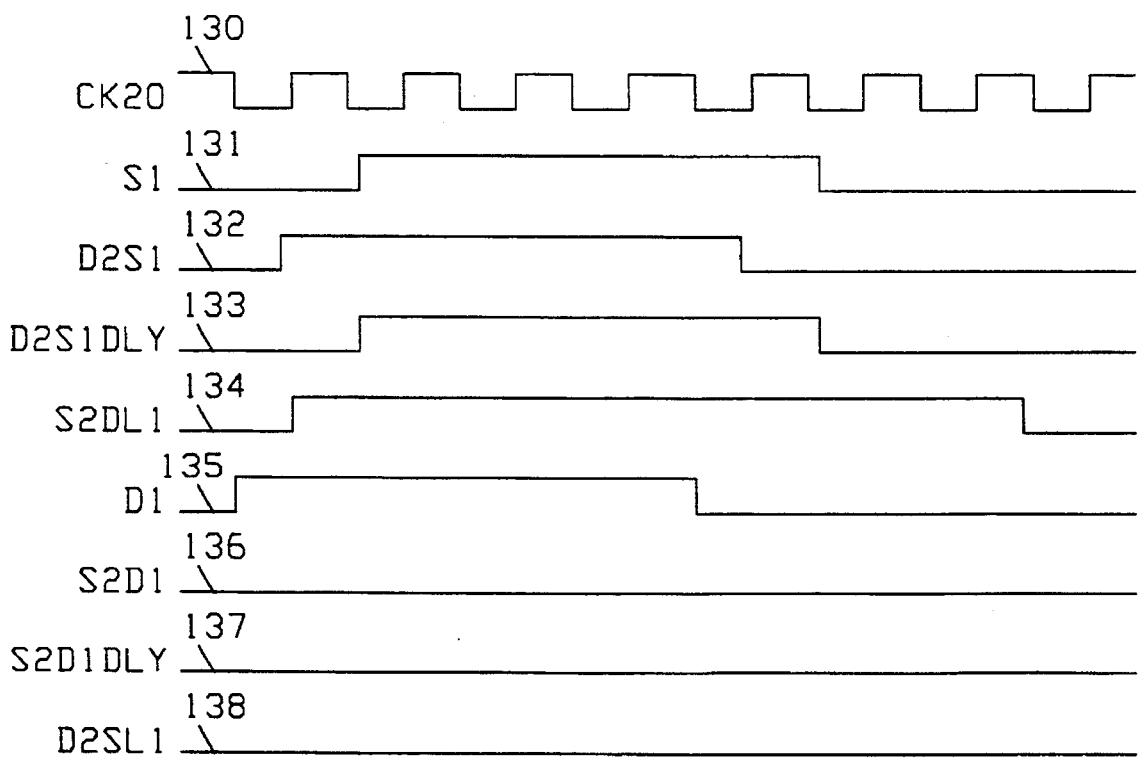
FIGS. 8A, 8B, 8C, 8D and 8E are timing diagrams that illustrate the operation of the converter circuit shown in FIG. 7.

To more fully appreciate the operation of the present invention, reference is now made to the timing diagrams shown in FIGS. 8A–8E. FIG. 8A illustrates what happens when the differential signal arrives on nodes 93a and 93b (FIG. 6) before a single-ended signal arrives at node 92. To begin with, waveform 130 represents the clock (CK) signal, and waveform 131 represents the single-ended signal appearing at the output of the inverter 95. Waveform 132 represents the output of the NAND gate 11 (FIG. 6), which is also the signal designated herein as SE. Waveform 133 represents the output of the delay circuit 123, which signal is designated herein as D2S1DLY. Waveform 134 represents the output of the OR gate 100, and the signal here is referred to as S2DL1. As a result of the S2DL1 signal going high, the S2D1 or DE signal is forced inactive (waveform 136). This state is remembered for three clock cycles by the delay circuits 121 and 123. Thus, when the D1 input signal goes away (even though the S1 signal will remain active due to IC delays) the circuitry will not allow the S2D1 or DE1 signal to be activated.

Waveform 135 represents the differential signal D1 appearing at the output of the amplifier 98 (FIG. 6). Note that the positive transition occurs prior to the S1 signal (waveform 131). Waveforms 136,137, and 138 represent the outputs of the NAND gate 100, the delay circuit 121 and the OR gate 101.

Figure 8B:
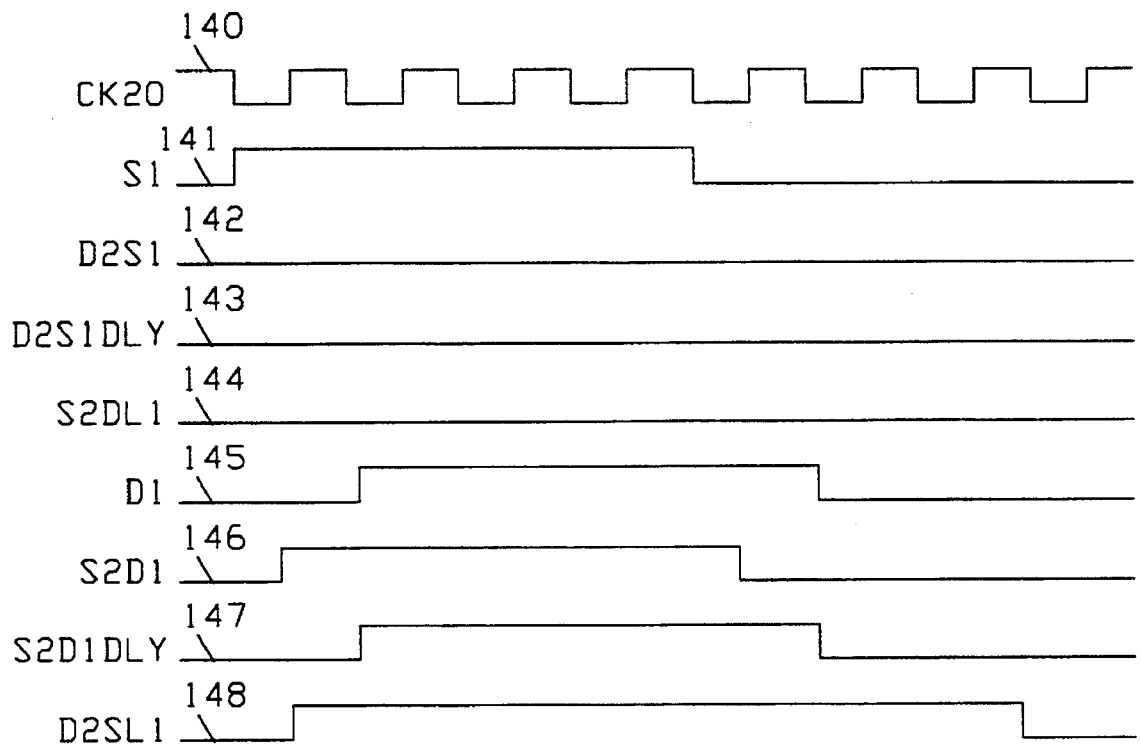

Referring now to FIG. 8B, the situation where the S1 signal arrives before the D1 signal is shown. Waveform 140 represents the clock and waveform 141 represents the S1 signal. Waveform 142 represents the D2S1 signal (output of the NAND gate 111) and waveform 143 represents the delayed version D2S1DLY (output of the delay circuit 121). Waveform 144 represents the S2DL1 signal (output of the OR gate 100) and waveform 145 represents the D1 signal. Waveform 146 represents the S2D1 signal at the output of the NAND gate 110 and is the result of the S1 signal going active. Waveform 147 represents the S2D1DLY signal appearing at the output of the delay circuit 123 as a result of the D2S1 signal going active. Finally, waveform 148 represents the D2SL1 signal appearing at the output of the OR gate 101.

As a result of the DE signal going active, the amplifier 97 (FIG. 6) is enabled and the single-ended signal (S1) is passed through the NAND gate 94 to the input of the amplifier 97. The signal appearing at the output of the amplifier 97 is in the differential format, which was converted from the single-ended format. Note that the D2S1 or SE signal remains inactive due to the S2DL1 being inactive.

Figure 8C:
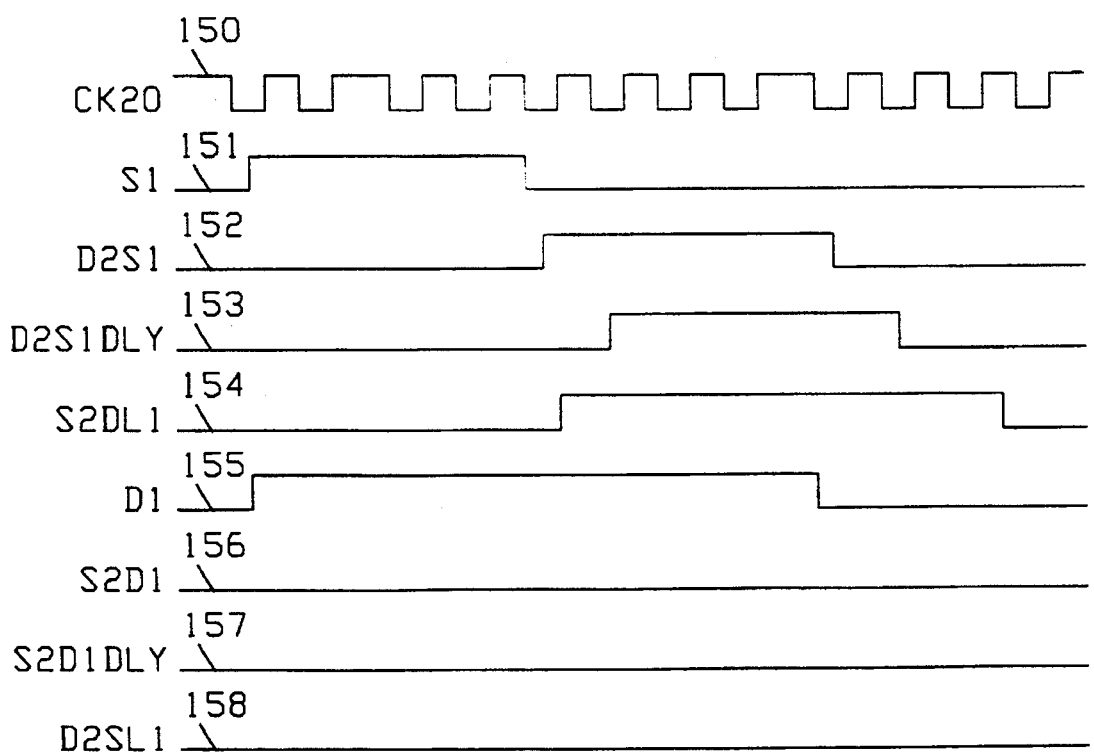
Figure 8D:
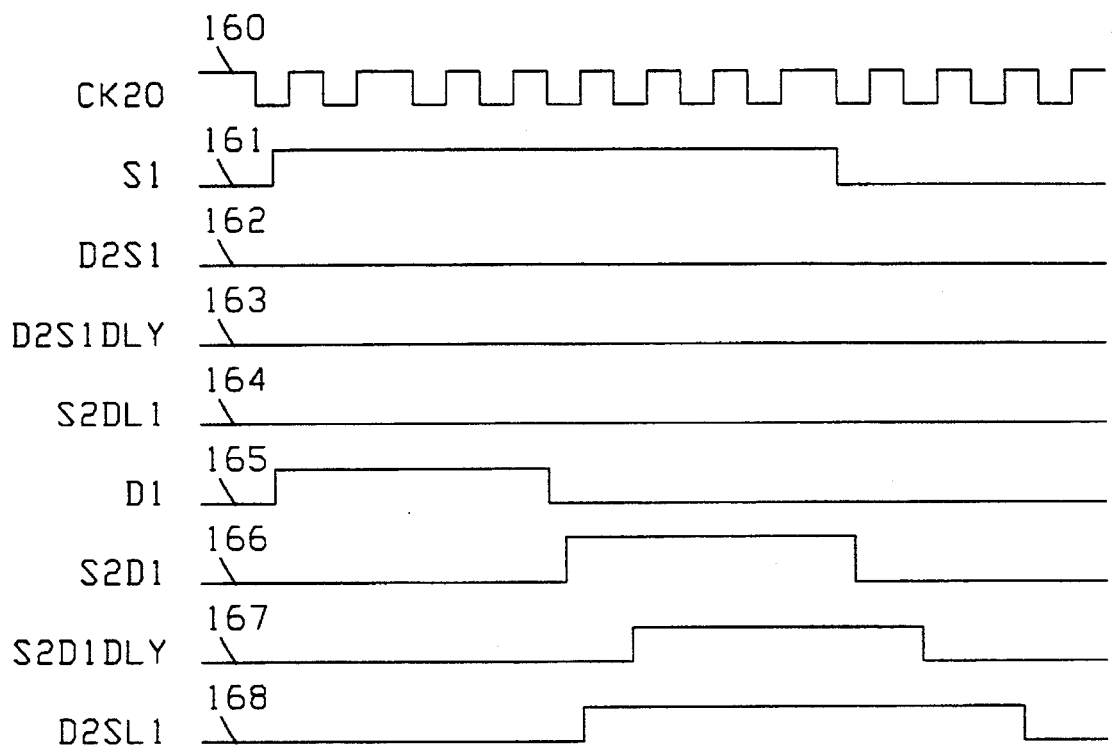

FIGS. 8C and 8D illustrate how the circuit of the present invention operates in the situation where the S1 and D1 signals arrive at the same time. In FIG. 8C, the S1 signal goes inactive before the D1 signals goes inactive, and in FIG. 8D the D1 signal goes inactive before the S1 signal goes inactive. Waveform 150 represents the clock signal, and waveform 151 represents the S1 signal. Waveforms 152 and 153 represent the D2S1 and D2S1DLY signals, respectively. Waveform 154 represents the S2DL1 signal and waveform 155 represents the D1 signal. Note that waveforms 151 and 155 go active at the same time, but waveform 151 goes inactive first.

Waveforms 156, 157 and 158 represent the S2D1, S2D1DLY and the D2SL1 signals, respectively; all of which are inactive in this scenario. Note that the D2S1 and S2D1 signals are inactive at the same time, which is desired in this situation. However, when the S1 signal goes inactive the D2S1 signal goes active., thereby converting the differential signal to a single-ended signal.

The situation shown in FIG. 8D is the same as shown in FIG. 8C, except that the D1 signal (waveform 165) goes inactive before the S1 signal (waveform 161) goes inactive. In this situation, the single-ended signal is converted to a differential signal as a function of the S2D1 or DE signal (waveform 166) going active.

Figure 8E:
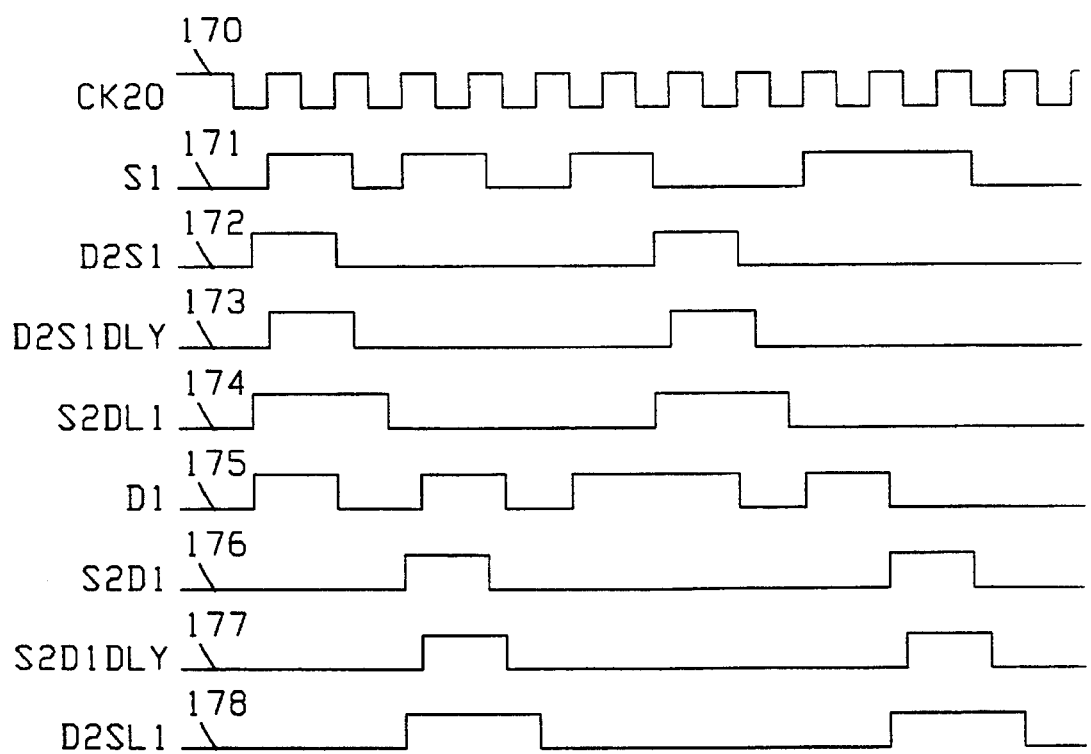

FIG. 8E is a summary of the operations described above.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. An apparatus in a computer peripheral device for determining the direction of signal and data flow using SCSI bus protocol including BUS BUSY (BSY), COMMAND or DATA (C/D), MESSAGE (MSG), INPUT or OUTPUT (I/O) and SELECT DEVICE (SEL) phases, said apparatus comprising:

a. time delay means responsive to said BSY and SEL phases, said time delay means being disposed for generating an arbitration selection signal defining a period of time to determine control of said SCSI bus;

b. first circuit means responsive to said arbitration selection signal and said BSY, SEL and I/O phases, said first circuit means being disposed for generating a plurality of signals that determine whether said peripheral device is an initiator of signals to be transmitted on said SCSI bus or a target for receipt of signals present on said SCSI bus;

c. second circuit means responsive to said plurality of signals generated by said first circuit means and said BSY, SEL, I/O, MSG and C/D phases, said second circuit means being disposed for generating a pair of signals indicative of the direction of data and signal flow on said SCSI bus and further including a first gating network having inputs coupled to said MSG, C/D and I/O phases and having outputs coupled to a first set of inputs of a first pair of AND gates, respectively, and a second set of inputs coupled to an output of a latch means set and reset as a function of said BSY and SEL phases, wherein an output of a first of said first pair of AND gates is a signal indicative of said peripheral device being an initiator and an output of a second of said pair of AND gates is a signal indicative of said peripheral device being a target device, and a second gating network having a first set of inputs coupled to said output of said first of said first pair of AND gates, a second set of inputs coupled to said output of said second of said pair of AND gates and a third set of inputs coupled to outputs of said first circuit means, a first output of said second gating network providing a signal for converting from single-ended to differential signal format thereby forcing signal and data flow in a first direction, and a second output of said second gating network providing a signal for converting from differential to single-ended signal format thereby forcing signal and data flow in a second direction.

2. An apparatus as in claim 1 wherein said time delay means includes a counter means that is enabled by status signals on said SCSI bus.

3. An apparatus as in claim 2 further including latch means set as a function of the count in said counter means and reset as a function of status signals on said SCSI bus, the output of said latch means being said arbitration selection signal.

4. An apparatus as in claim 1 wherein said first circuit means includes a pair of gating means having inputs disposed for receiving said arbitration selection signal and status signals of said SCSI bus and outputs coupled to inputs of a pair of latch means, respectively, said gating means being disposed for setting said latch means in response to said arbitration selection signal as a function of status of said SCSI bus.

5. An apparatus as in claim 4 wherein an output of a first of said pair of latch means is a signal indicative of said peripheral device being selected for control of said SCSI bus, thereby being an initiator device for transmitting signals.

6. An apparatus as in claim 5 including AND gating means having a first set of inputs coupled to the output of said first of said pair of latch means, a second set of inputs disposed for receiving signals indicative of the direction of signal flow on said SCSI bus and outputs coupled to inputs of a second pair of latch means, said AND gating means being disposed for setting said second pair of latch means during a select mode of operation.

7. An apparatus as in claim 4 wherein an output of a second of said pair of latch means is a signal indicative of said peripheral device being selected to receive signals from said SCSI bus, thereby being a target device for receipt of signals.

8. An apparatus as in claim 7 further including AND gating means having a first set of inputs coupled to the output of said second of said pair of latch means, a second set of inputs disposed for receiving signals indicative of the direction of signal flow on said SCSI bus and outputs coupled to inputs of a third pair of latch means, said AND gating means being disposed for setting said third set of latch means as a function of a reselect mode of operation.

9. An apparatus as in claim 1 wherein said second circuit means includes a latch means set when said SCSI bus is not busy and having an output thereof.

10. An apparatus in a computer peripheral device for determining the direction of signal and data flow using SCSI bus protocol including BUS BUSY (BSY), COMMAND or DATA (C/D), MESSAGE (MSG), INPUT or OUTPUT (I/O) and SELECT DEVICE (SEL) phases, said apparatus comprising:

a. time delay means responsive to said BSY and SEL phases, said time delay means being disposed for generating an arbitration selection signal defining a period of time to determine control of said SCSI bus, said time delay means further including a counter means that is enabled by status signals on said SCSI bus;

b. first circuit means responsive to said arbitration selection signal and said BSY, SEL and I/O phases, said first circuit means being disposed for generating a plurality of signals that determine whether said peripheral device is an initiator of signals to be transmitted on said SCSI bus or a target for receipt of signals present on said SCSI bus, said first circuit means further including a pair of gating means having inputs disposed for receiving said arbitration selection signal and status signals of said SCSI bus and outputs coupled to inputs of a pair of latch means, respectively;

c. second circuit means responsive to said plurality of signals generated by said first circuit means and said BSY, SEL, I/O, MSG and C/D phases, said second circuit means being disposed for generating a pair of signals indicative of the direction of data and signal flow on said SCSI bus and further including a first gating network having inputs coupled to said MSG, C/D and I/O phases and having outputs coupled to a first set of inputs of a first pair of AND gates, respectively, and a second set of inputs coupled to an output of a latch means set and reset as a function of said BSY and SEL phases, wherein an output of a first of said first pair of AND gates is a signal indicative of said peripheral device being an initiator and an output of a second of said pair of AND gates is a signal indicative of said peripheral device being a target device, and a second gating network having a first set of inputs coupled to said output of said first of said first pair of AND gates, a second set of inputs coupled to said output of said second of said pair of AND gates and a third set of inputs coupled to outputs of said first circuit means, a first output of said second gating network providing a signal for converting from single-ended to differential signal format thereby forcing signal and data flow in a first direction, and a second output of said second gating network providing a signal for converting from differential to single-ended signal format thereby forcing signal and data flow in a second direction.

11. An apparatus as in claim 10 further including latch means set as a function of the count in said counter means and reset as a function of status signals on said SCSI bus, the output of said latch means being said arbitration selection signal.

12. An apparatus as in claim 11 wherein an output of a first of said pair of latch means is a signal indicative of said peripheral device being selected for control of said SCSI bus, thereby being an initiator device for transmitting signals.

13. An apparatus as in claim 12 including AND gating means having a first set of inputs coupled to the output of said first of said pair of latch means, a second set of inputs disposed for receiving signals indicative of the direction of signal flow on said SCSI bus and outputs coupled to inputs of a second pair of latch means, said AND gating means being disposed for setting said second pair of latch means during a select mode of operation.

14. An apparatus as in claim 10 wherein an output of a second of said pair of latch means is a signal indicative of said peripheral device being selected to receive signals from said SCSI bus, thereby being a target device for receipt of signals.

15. An apparatus as in claim 14 further including AND gating means having a first set of inputs coupled to the output of said second of said pair of latch means, a second set of inputs disposed for receiving signals indicative of the direction of signal flow on said SCSI bus and outputs coupled to inputs of a third pair of latch means, said AND gating means being disposed for setting said third set of latch means as a function of a reselect mode of operation.

16. An apparatus in a computer peripheral device for determining the direction of signal and data flow using SCSI bus protocol including BUS BUSY (BSY), COMMAND or DATA (C/D), MESSAGE (MSG), INPUT or OUTPUT (I/O) and SELECT DEVICE (SEL) phases, said apparatus comprising:

a. a time delay means responsive to said BSY and SEL phases, said time delay means being disposed for generating an arbitration selection signal defining a period of time to determine control of said SCSI bus, said time delay means further including a counter means that is enabled by status signals on said SCSI bus and a latch means set as a function of the count in said counter means and reset as a function of status signals on said SCSI bus, the output of said latch means being said arbitration selection signal;

b. first circuit means responsive to said arbitration selection signal and said BSY, SEL and I/O phases, said first circuit means being disposed for generating a plurality of signals that determine whether said peripheral device is an initiator of signals to be transmitted on said SCSI bus or a target for receipt of signals present on said SCSI bus, said first circuit means further including a pair of gating means having inputs disposed for receiving said arbitration selection signal and status signals of said SCSI bus and outputs coupled to inputs of a pair of latch means, respectively, wherein an output of a first of said pair of latch means is a signal indicative of said peripheral device being selected for control of said SCSI bus, thereby being an initiator device for transmitting signals and AND gating means having a first set of inputs coupled to the output of said first of said pair of latch means, a second set of inputs disposed for receiving signals indicative of the direction of signal flow on said SCSI bus and outputs coupled to inputs of a second pair of latch means;

c. second circuit means responsive to said plurality of signals generated by said first circuit means and said BSY, SEL, I/O, MSG and C/D phases, said second circuit means being disposed for generating a pair of signals indicative of the direction of data and signal flow on said SCSI bus, and further including a first gating network having inputs coupled to said MSG, C/D and I/O phases and having outputs coupled to a first set of inputs of a first pair of AND gates, respectively, and a second set of inputs coupled to an output of a latch means set and reset as a function of said BSY and SEL phases, wherein an output of a first of said first pair of AND gates is a signal indicative of said peripheral device being an initiator and an output of a second of said pair of AND gates is a signal indicative of said peripheral device being a target device, and a second gating network having a first set of inputs coupled to said output of said first of said first pair of AND gates, a second set of inputs coupled to said output of said second of said pair of AND gates and a third set of inputs coupled to outputs of said first circuit means, a first output of said second gating network providing a signal for converting from single-ended to differential signal format thereby forcing signal and data flow in a first direction, and a second output of said second gating network providing a signal for converting from differential to single-ended signal format thereby forcing signal and data flow in a second direction.

17. An apparatus as in claim 16 wherein said second circuit means further includes a first gating network having inputs coupled to status signals of said SCSI bus and having outputs coupled to a first set of inputs of a first pair of AND gates, respectively, and a second set of inputs coupled to an output of a latch set and reset as a function of status of said SCSI bus, wherein the output of a first of said first pair of AND gates is a signal indicative of said peripheral device being an initiator device and the output of a second of said first pair of AND gates is a signal indicative of said peripheral device being a target device.

* * * * *